United States Patent [19]

Londos et al.

[11] 4,437,808

[45] Mar. 20, 1984

[54] APPARATUS FOR CAUSING A UNIT GUIDED ON RECTILINEAR RAILS TO MOVE GRADUALLY AND A FORKLIFT EQUIPPED WITH SUCH A UNIT

[75] Inventors: Rene Londos; Jean-Luc Barbereau, both of Saint-Jean-de-Braye, France

[73] Assignee: Compagnie Generale de Manutention et de Stockage, Paris, France

[21] Appl. No.: 367,522

[22] Filed: Apr. 12, 1982

[30] Foreign Application Priority Data

Apr. 27, 1981 [FR] France ............................... 81 08304

[51] Int. Cl.[3] ............................................ B65G 1/06

[52] U.S. Cl. ........................................ 414/667; 74/50

[58] Field of Search ............... 414/282, 662, 663, 664, 414/667, 668, 671; 74/49, 50

[56] References Cited

U.S. PATENT DOCUMENTS

| | | | |
|---|---|---|---|
| 3,561,620 | 2/1971 | Willis | 414/282 |
| 3,765,251 | 10/1973 | Whitenack | 74/29 |
| 3,805,627 | 4/1974 | Burton | 74/52 |

FOREIGN PATENT DOCUMENTS

| | | | |
|---|---|---|---|
| 2545010 | 7/1979 | Fed. Rep. of Germany . | |
| 602535 | 3/1926 | France . | |
| 1482599 | 5/1967 | France . | |
| 2214643 | 8/1974 | France . | |
| 2322088 | 3/1977 | France . | |
| 569938 | 8/1977 | U.S.S.R. | 74/50 |

OTHER PUBLICATIONS

Noell et al., *IBM Technical Disclosure Bulletin,* vol. 2, No. 5, Feb. 1980, "Tandem Scotch Yoke Assembly," p. 10.

*Primary Examiner*—Robert J. Spar
*Assistant Examiner*—Ken Muncy
*Attorney, Agent, or Firm*—Sughrue, Mion, Zinn, Macpeak & Seas

[57] ABSTRACT

An apparatus for causing a load support guided on rectilinear rails to move gradually. The apparatus having a rectilinear slot integral with the support to be driven and a crankpin which engages in the slot and forces the slot to move. The slot (54) is elongated perpendicularly to the direction of movement and is open at both its ends and it has two toothed wheels (42, 43) driven in opposite directions, mounted on either side of a neutral central position of the slot and each bearing an excentric crankpin (50, 52) which engages in the slot an drives it while it runs through a half-circumference round the toothed wheel, the other crankpin engaging in the slot and driving it while it runs alone through the other half-circumference.

7 Claims, 2 Drawing Figures

APPARATUS FOR CAUSING A UNIT GUIDED ON RECTILINEAR RAILS TO MOVE GRADUALLY AND A FORKLIFT EQUIPPED WITH SUCH A UNIT

BACKGROUND OF THE INVENTION

There are numerous apparatus by which a determined unit can be driven along rectilinear rails between two end positions. In contrast, driving a load support between these two positions sets up problems which are difficult to solve such as that of stability of the load supported, since accelerating and decelerating the movement depend on the mass to be moved, and said mass is frequently variable. This problem is encountered in particular in the case of forklifts whose telescopic forks must move from one side to the other of a passage so as to deposit and/or take up various loads stored in pigeon-holes since these forks must reach precise points in the pigeon-holes whether they are carrying a load or not and whatever the weight of the load may be.

The present invention aims to remedy the drawbacks of known apparatus by providing a drive apparatus which allows a load support to be moved on rectilinear rails and to impart to said drive apparatus a gradual movement independent from the mass of the load while ensuring that the drive apparatus stops at precisely the required place.

SUMMARY OF THE INVENTION

The invention provides an apparatus for causing a load support guided on rectilinear rails to move gradually in either of two directions between two end positions, said apparatus having a rectilinear slot integral with the support to be driven and a crankpin which engages in said slot and forces the slot to move, wherein said slot is elongated perpendicularly to the direction of movement and is open at both its ends and wherein it has two toothed wheels driven in opposite directions, mounted on either side of a neutral central position of the slot and each bearing an excentric crankpin which engages in the slot and drives it while it runs through a half-circumference round the toothed wheel, the other crankpin engaging in the slot and driving it alone while it runs through the other half-circumference.

In such an apparatus, the travel of the support along the rectilinear rails is determined by the movement of one of the two crankpins in the slot. Also, on starting up, the drive action of the crankpin in the slot begins gradually, regardless of the load placed on the support and independently from said load. Likewise, at the end of the travel, the action of the crankpin on the edge of the slot is gradually reduced because of its circular travel which, at its end, is tangential to the slot, again regardless of the load.

The apparatus in accordance with the invention is particularly suitable for driving telescopic forks of a forklift in a gradual movement to left or right in a passage.

The invention therefore also provides a forklift with a telescopic fork whose two prongs are constituted by superposed sliders which move relative to one another and a drive means, wherein it has a support plate which is fixed transversely on the corresponding moving sliders of the two prongs and has a slot perpendicular to those sliders and open at both its ends, and, between two stationary sliders for supportingg the prongs, two rotating toothed wheels mounted on the frame and driven in opposite directions and engaging two crankpins alternately in the slot, which crankpins each follow a circular path around the axle of the toothed wheel which carries it.

BRIEF DESCRIPTION OF THE DRAWINGS

An embodiment of the invention is described with reference to the accompanying drawing in which.

MORE DETAILED DESCRIPTION

Figure 1:
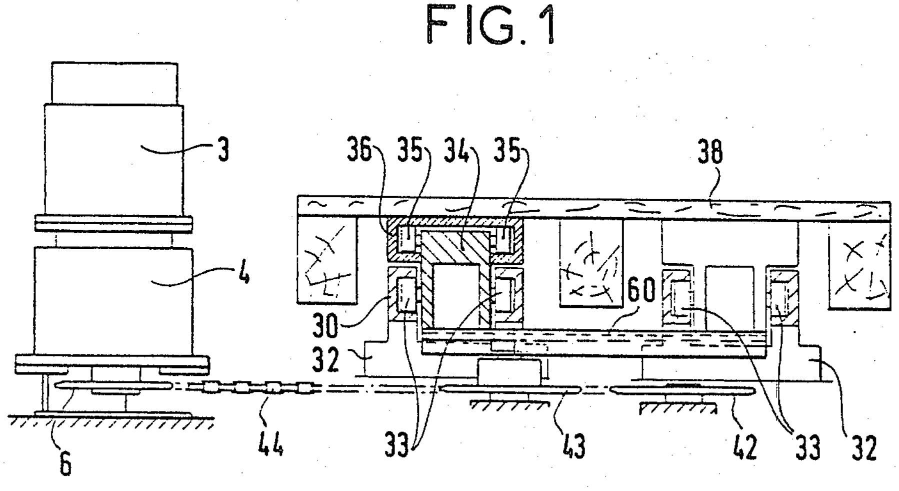
FIG. 1 is a schematic elevation of a forklift to which the invention is applied.

The apparatus in accordance with the invention is intended to provide rectilinear movement of a load support constituted by two prongs of a telescopic forklift. The prongs are parallel and are preferably each constituted by three sliders which are telescopically mounted. A lower or stationary slider 30 is supported at each of its ends by a support block 32 integral with the framework of the forklift and forms two slideways in which roll rollers 33 which are integral with an intermediate slider 34. A third slider 36 slides by means of rollers 35 on said intermediate slider 34 and the load to be carried, represented in the form of a pallet 38, rests on the two upper sliders 36 of the prong. The intermediate sliders 34 of the two prongs of the telescoping fork on the forklift are connected together by a support plate 60 fixed transversally to the two intermediate sliders.

The function of the drive equipment of the invention is to drive said plate 60 in a rectilinear manner by means of a motor 3 associated with a reduction gear 4 which drives a toothed wheel 6, making it rotate at a constant speed.

Figure 2:
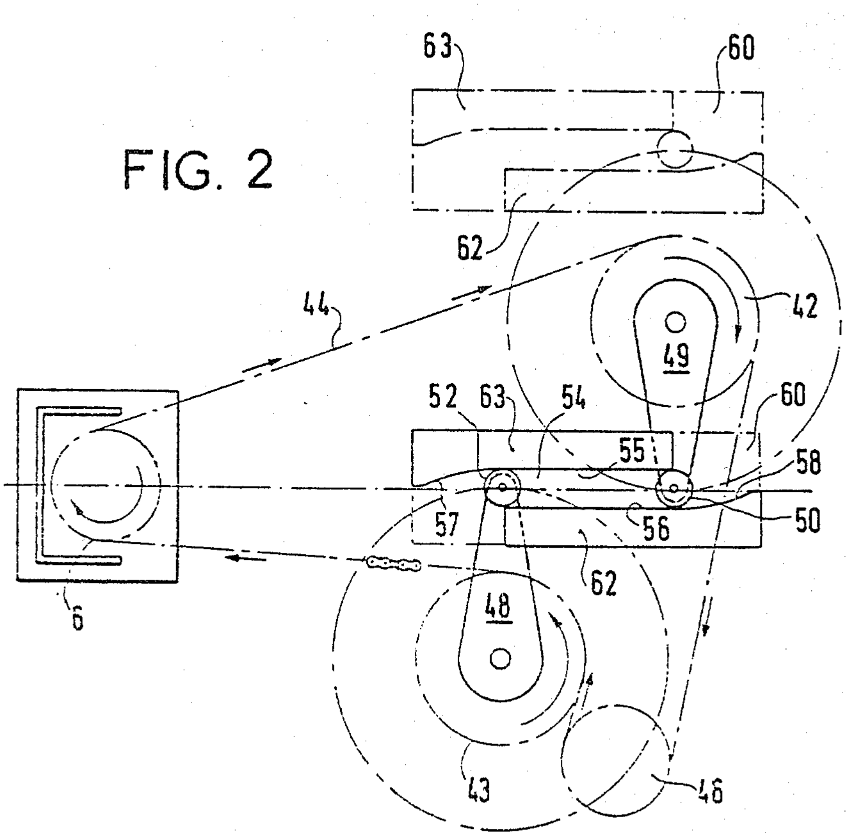
FIG. 2 is a bottom plan view which schematically illustrates the drive apparatus.

The toothed wheel 6 is linked by a chain 44 to two toothed wheels 42 and 43 respectively which can move only to rotate and are driven by the chain 44 in the opposite direction by means of a direction-changer gear 46 (FIG. 2).

Each of the toothed wheels 42 and 43 has a radial arm 49 and 48 respectively at the end of which a crankpin 50 and 52 respectively is fitted, which crankpin thus runs along a circular path about the axis of the corresponding toothed wheel 42 or 43 when the latter rotates.

Further, the support plate 60 to be driven has a narrow elongated slot 54 which is open at both ends and is delimited by two section bars 62 and 63 which are shifted relative to each other and are fitted under the support plate 60. The slot has two parallel rectilinear edges 55 and 56 equal in length each of which is prolonged at one end by a curved ramp 57 and 58 respectively, these two ramps pointing in opposite directions.

Said drive equipment has a central neutral point shown in solid lines in FIG. 2. In said neutral position, the two crankpins 50 and 52 are engaged in the slot 54, each near one end thereof. If the drive gear 6 is driven clockwise, for example, the toothed wheel 42 which rotates in the same direction moves the crankpin 50 towards the inside of the slot 54, while the toothed wheel 43 rotates in the opposite direction and makes the crankpin 52 leave the slot 54. The crankpin 50 therefore operates alone in the slot 54 and obliges it to move gradually along the slide rails on which the support plate 60 is mounted. The movement of the slot 54 corresponds to a rotation of the toothed wheel 42 through half a turn, i.e. to a movement of the crankpin 50 through a semi-circle.

Meanwhile, the crankpin 52 has rotated through a half turn under no load outside the slot. The plate 60 or the slot 54 returns to the neutral position in the opposite direction simply by changing the rotation direction of the drive gear 6. This also makes the crankpin 52 return backwards until it enters the slot 54. If, at that instant, the drive gear 6 continues to rotate in a counter-clockwise direction, the crankpin 52 drives the support 60 as well as the slot 54 and causes it to move, its stroke being equivalent to the first stroke but in the opposite direction, while the crankpin 50 rotates through a half turn under no load.

The dimensions of the slot 54 and the shapes of the ramps 57, 58 as well as the relative positions of the circular paths of the crankpins 50 and 52 are such that there is always at least one crankpin engaged in the slot 54, the crankpin 50 being practically locked in the slot 54 as long as the crankpin 52 is not completely engaged therein, and vice-versa.

The set of toothed wheels 42 and 43 and the set of arms 48, 49 are assembled beneath the telescopic fork, between stands 32 which support the two prongs.

The forklift thus produced makes it possible to put loads into or take them from storage locations located on either side of a passage in which the forklift runs. The forklift moves with precision and without danger of any instability whatever the load may be, due to the fact that the crankpin co-operates with the slot and in particular to the fact that acceleration and deceleration are obtained without requiring a particular adjustment of the motor speed. This simplicity of control and especially the certainty of deceleration down and acceleration, optionally make it possible for movement to be accelerated by increasing the motor speed when it is required to obtain a shorter cycle time e.g. for no-load movement.

Of course, the apparatus in accordance with the invention is not limited to controlling the telescopic prongs of forklifts. It can be used for numerous other applications each time it is required to obtain precise and progressive movement independently from the moving mass and more particularly when two-way movement is required.

Although drive by means of a chain 44 seems suitable, it may be advantageous to replace said chain by gear trains carried on the framework of the forklift.

Of course, the upper slider 36 of a prong of the fork is connected to the intermediate slider 34 by a system of toothed wheels and a chain which causes it to move relative to said intermediate slider 34, linked to the support plate 60 as the latter moves along the stationary slider 30 in a usual way. Simply controlling the rotation direction of the motor 4 allows the loads stocked in the locations on either side of the passage to be deposited or removed.

We claim:

1. An apparatus for causing a load to be moved gradually in either of two directions between two end positions, said apparatus comprising: a load support, rectilinear rails for guiding said support for movement along said rails, said support having a rectilinear slot, said slot being elongated perpendicularly to the direction of movement of said support and being open at both its end, toothed wheels driven in opposite directions, mounted on either side of a a neutral central position of the slot, each wheel bearing an eccentric crankpin which engages in the slot to drive it while it runs through a half-circumference around the toothed wheel and said crankpins alternately engaging said slot so as to drive it alone while running through a half-circumference.

2. An apparatus according to claim 1, wherein each crankpin is borne by a radial arm on the outside of the corresponding toothed wheel and following a circular path during the rotation thereof.

3. An apparatus according to either one of claims 1 or 2, wherein the open slot is curved at each end to form two crankpin guide ramps pointing in opposite directions for allowing the crankpins to be locked.

4. An apparatus according to claims 1 or 2, wherein the toothed wheels are driven by means of a transmission chain or of a set of toothed wheels, by a drive gear whose direction of rotation can be reversed.

5. An apparatus according to claim 1, wherein in the neutral central position of the slot, the two crankpins are engaged simultaneously in the opposite ends of said slot.

6. A forklift having a telescopic fork, said fork comprising two prongs constituted by superposed sliders which move relative to one another, a drive means, a support plate which is fixed transversally on the corresponding moving sliders of the two prongs and having a slot perpendicular to those sliders, said slot being open at both its ends; and wherein said drive means comprises, between two stationary sliders for supporting the prongs, two rotating toothed wheels mounted on the frame and driven in opposite directions and engaging two crankpins alternately in the slot with said crankpins each following a circular path around the axle of the toothed wheel which carries it.

7. A forklift according to claim 6, wherein in the neutral central position in the slot, the moving sliders connected together by a support plate are retracted onto the stationary sliders with the crankpins each being engaged in the opposite ends of the slot.

* * * * *